United States Patent [19]
Nakano et al.

[11] 3,854,829
[45] Dec. 17, 1974

[54] JOURNALLING JOINT FOR CONNECTING ARMS TO EACH OTHER

[75] Inventors: Ryuzo Nakano, Aichi; Takeo Yamazaki, Anjo, both of Japan

[73] Assignee: Aisin Seiki Kabushiki Kaisha, Kariya-shi, Aichi-ken, Japan

[22] Filed: Apr. 6, 1973

[21] Appl. No.: 348,699

[30] Foreign Application Priority Data
Apr. 7, 1972  Japan.......................... 47-41519[U]

[52] U.S. Cl. ............................... 403/162, 308/2 R
[51] Int. Cl. ...................... F16c 11/00, F16d 27/00
[58] Field of Search ........... 403/161, 162, 163, 119; 308/2 R

[56] References Cited
UNITED STATES PATENTS

| | | | |
|---|---|---|---|
| 2,240,946 | 5/1941 | Vido ............................... | 403/119 X |
| 2,441,552 | 5/1948 | Barnes ............................ | 403/162 X |
| 2,632,661 | 3/1953 | Cristofv ........................... | 403/119 |
| 2,878,639 | 3/1959 | Cline .............................. | 403/119 X |

*Primary Examiner*—Geo V. Larkin
*Attorney, Agent, or Firm*—Berman, Bishoff & Platt

[57] ABSTRACT

A journalling joint in the form of a pair of crossed and pivoted arms, one arm having a circular through-hole in which is rotatably seated a journalling disc, the other arm being formed of two identical sections having inner and outer ends which are integrated by welding the inner ends of the two sections to the opposite faces of the journalling disc.

7 Claims, 5 Drawing Figures

PATENTED DEC 17 1974 3,854,829

3,854,829

JOURNALLING JOINT FOR CONNECTING ARMS TO EACH OTHER

BACKGROUND OF THE INVENTION

The present invention relates to a journalling joint particularly for use as part of a vehicle door window regulator, and comprising two relatively rotatable arms, the second arm being formed of two sections which are secured to a disc rotatably seated in a through-hole in the first arm.

SUMMARY OF THE INVENTION

The main object of the present invention is to provide a journalling joint composed of a pair of crossed and pivoted arms, the latter being formed of two sections which can easily be integrated by welding one end of each section to a disc rotatably seated in an opening passing through the other arm.

Another important object of the present invention is to provide a journalling joint, having the above-mentioned characteristics, wherein mechanical securement of the two sections of one arm is avoided, making assembly of the journal joint much easier and eliminating the disadvantages of such mechanical securement, such as the tendency to loosen, and the need for expensive machining of the securement means.

A further important object of the present invention is to provide a journalling joint, having the above-mentioned characteristics, and which can be lubricated easily and neatly for prevention of unnecessary friction and undesired noises.

Another object of the present invention is to provide a journalling joint, having the above-mentioned characteristics, wherein the joint can be assembled simply with a minimum number of steps and the entire device can be completed correspondingly easily and with lower production cost, and yet durability and long life are achieved.

According to the present invention, there is disclosed a journalling joint for rotatably connecting a first arm with a second arm, the latter including two identical sections, in which a disc-like journalling metal piece is rotatably seated in a circular through hole provided in the first arm, and the appropriate ends of the two sections of the second arm are welded to the opposite faces of the metal piece.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
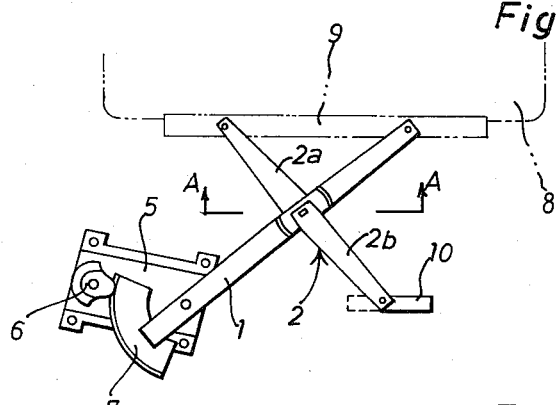
FIG. 1 is a front view of a vehicle door window regulator having a journalling joint in accordance with the present invention.

Referring now to the drawing, FIG. 1 illustrates a first preferred embodiment of a journalling joint in accordance with the present invention, wherein the joint is applied to a vehicle window regulator to open and close a window. The window regulator assembly comprises a lift arm 1, one end of which is journalled on a base plate 5 secured on an inner plate (not shown) of a vehicle door. The tip of this end is secured on a toothed sector 7 in engagement with a gear 6 journalled on the base plate 5 and rotated by a window crank handle (not shown). The other end of the lift arm 1 is held rotatably and horizontally moveably on a holding rail 9 for a window 8.

An equalizer arm 2 includes first and second identical sections 2a and 2b. The outer or top end of the first equalizer arm section 2a is held rotatably and horizontally moveably on the holding rail 9. The outer or top end of the second equalizer arm section 2b is held rotatably and horizontally moveably on a lower guide rail 10 secured on the inner plate of the vehicle door.

Figure 2:
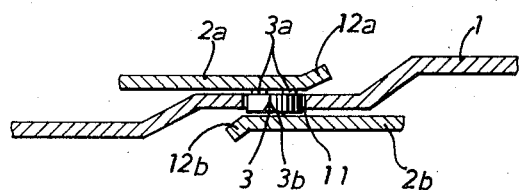
FIG. 2 is an enlarged transversely cross-sectional view taken along line A — A in FIG. 1.

As best shown in FIG. 2, the inner or base ends of the first and the second equalizer arm sections 2a and 2b are provided respectively with bends 12a and 12b to provide a reservoir therein grease for lubrication and prevention of noises. The lift arm 1 is provided approximately at the center thereof with a circular hole 11 to rotatably seat therein a circular journalling metal piece 3, or disk, which will be discussed in detail hereinafter. The base ends of the first and the second equalizer arm sections 2a and 2b are opposed to hold the metal piece 3 therebetween.

Figure 3:
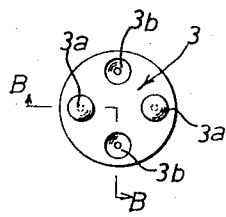
FIG. 3 depicts an enlarged front view of a metal piece forming the important pivot element of the journalling joint illustrated in FIG. 2.
Figure 4:
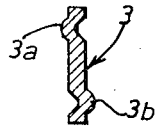
FIG. 4 is a cross-sectional view taken along the arrows B — B in FIG. 3.

Reference is now made to FIGS. 3 and 4. The journalling metal piece 3 is formed with a diameter corresponding to that of the circular hole 11 of the lift arm 1. On one face of the metal piece 3, a pair of bosses 3a are punched out symmetrically along a first diameter of the face. Another pair of punched bosses 3b are also provided on the other face of the metal piece 3 symmetrically along a second diameter which crosses the first diameter at a right angle.

When the loose assembling as mentioned above in reference to FIG. 2 is completed, projection welding, by electrical conduction with pressure by way of a planar electrode, is applied across the base ends of the first and the second equalizer arm sections 2a and 2b and the journalling metal piece 3. Electrical current flows freely to the punched bosses 3a and 3b which are then melted by high heat produced thereon. Consequentially, the base ends of the equalizer arm sections 2a and 2b and the metal piece 3 are integrally welded together by the pressure applied.

Rotation of the crank handle rotates the toothed sector 7 by way of the gear 6. This causes relative rotation of the lift arm 1 and the equalizer arm 2 with the disc 3 as the rotation fulcrum. The changes of the crossing angle of the two arms 1 and 2 by the relative rotation thereof cause the window supporting rail 9 to raise and lower without deviating from its horizontal attitude.

Figure 5:
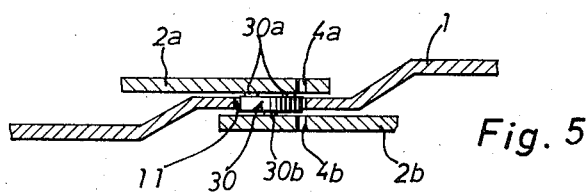
FIG. 5 is an enlarged transversely cross-sectional view corresponding to FIG. 2, but showing another embodiment of the invention.

FIG. 5 illustrates another preferred embodiment of the journalling point of the present invention, wherein the same and similar reference numerals depict the same and similar component parts and portions in the first embodiment. The general construction and operation of this second preferred embodiment are the same or similar to those of the first embodiment and no repetition is made here.

The distinguishing features in the second preferred embodiment is represented by punched bosses 30a and 30b which are now provided on the interior faces of the base ends of the first and the second equalizer arm sections 2a and 2b and also by lubrication holes 4a and 4b drilled respectively through the base ends of the first and the second equalizer arm sections 2a and 2b so as to replace the bends 12a and 12b of the first preferred embodiment. The punched bosses 30a and 30b are provided respectively in pairs on the positions corresponding to those on the metal piece 3 in the first preferred embodiment. A metal piece 30 in this second embodiment is formed in a circular shape with flat faces, and is affixed to arm sections 2a and 2b by pressure welding in the same manner as disc 3 is affixed in the first embodiment.

Projection welding is referred to in the above embodiments, but such other ways as spot welding and the like are applicable as well.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A journalling joint for use in raising and lowering a vehicle door window, or the like, comprising first and second arms, a circular through-hole provided in said first arm, a metal disc rotatably seated in said through-hole, said disc having opposed faces substantially parallel with the respective face portions of the first arm which surround the through-hole, said second arm being formed of two sections, each of said sections having a base end and an outer end, and the base ends of said sections of said second arm being welded to the opposed faces of said disc, whereby said two arms are pivoted to one another for relative rotational movement.

2. A journalling joint as claimed in claim 1, wherein said two arm sections forming said second arm are each bent outwardly at its base end to define an enlarged space between the base end and an adjacent portion of the first arm for reception of lubricating grease.

3. A journalling joint as claimed in claim 1, wherein said base ends of said two arm sections forming said second arm are respectively provided with holes drilled therethrough for reception of grease and for feeding grease to the circular through-hole in the first arm.

4. A journalling joint as claimed in claim 1, wherein said disk is provided with a plurality of bosses on each of the opposed faces thereof, said base ends of said two identical arm sections of said second arm being welded to said bosses.

5. A journalling joint as claimed in claim 4, wherein said bosses are aligned on one face of said disk symmetrically in pairs along a first diameter along the face of the disk and on the other face of said disk symmetrically in pair along a second diameter which crosses said first diameter.

6. A journalling joint as claimed in claim 1, wherein said disk has opposed flat faces, said two identical arm sections of said second arm being provided on their base ends respectively with a plurality of bosses which are engaged against and welded to the flat faces of the disk.

7. A journalling joint as claimed in claim 6, wherein a pair of said bosses are symmetrically positioned in a transverse line across the interior face of the base end of one arm section of said second arm, and another pair of said bosses are positioned symmetrically on a central axis of the interior face of said base end of the other arm section, said central axis and transverse line of the arm sections crossing one another.

* * * * *